Patented July 14, 1936

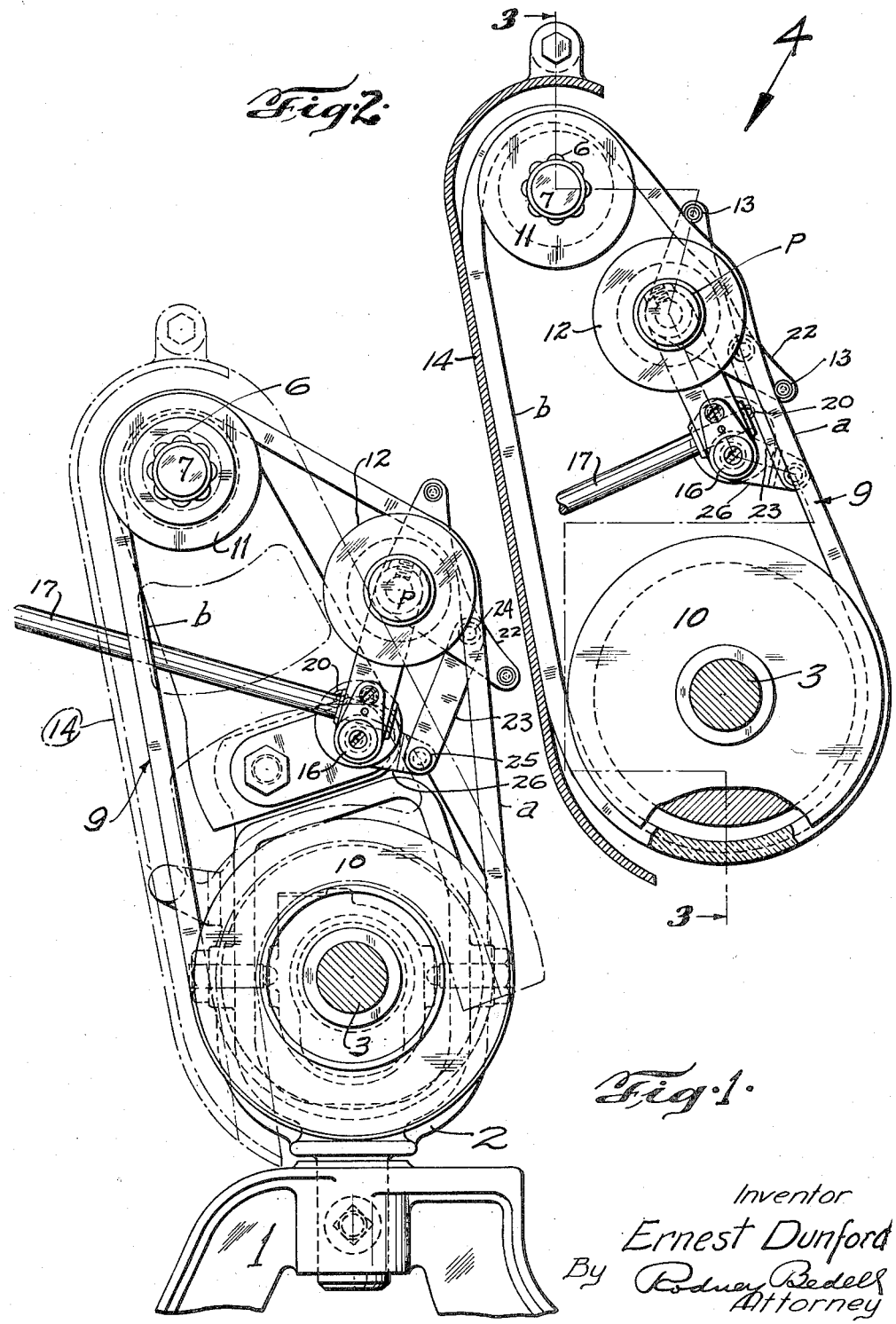

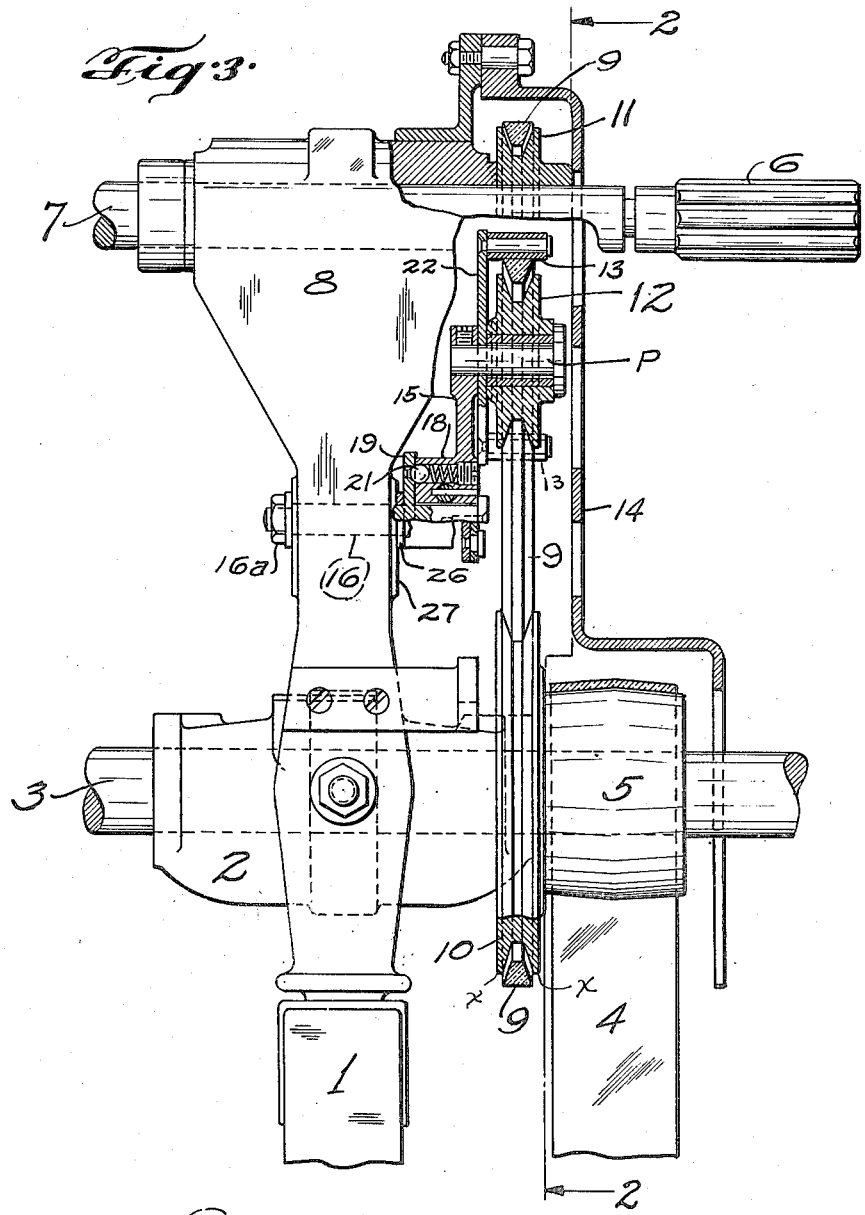
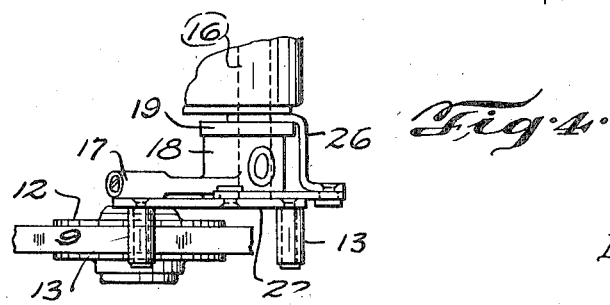

2,047,362

UNITED STATES PATENT OFFICE 2,047,362

PULLEY BELT CONTROL DEVICE

Ernest Dunford, St. Louis, Mo., assignor to Landis Machine Company, St. Louis, Mo., a corporation of Missouri Application October 29, 1934, Serial No. 750,437

3 Claims. (Cl. 74—242.10)

The invention relates to pulley belts and more particularly to V-shaped belts, rope belts, or other belts of substantially greater thickness than the ordinary flat belt.

The invention consists in structure for tightening the belt when desired and completely releasing the belt from its driving pulley at other times.

It has long been the practice with flat belts to use an idler pulley for tightening the belt against driving and driven pulleys. Because of the flexibility of the flat belt and the flat surface contact between the belt and its pulleys, the release of the idler pulley would result in the practical elimination of friction between the belt and the driving pulley and insure cessation of movement of the driven pulley.

When a tightener for a V-shaped belt is released, the stiffness of the belt tends to maintain the sides of the belt in contact with the pulley groove and tends to continue the rotation of the belt and driven pulley.

The contour of V-belts and their pulley grooves make for effectiveness with less "wrap around" on the pulleys. Hence a V-belt may often be used which is much shorter than a flat belt for the same work. In many installations the V-belt is so short that it is difficult or impossible to provide sufficient slack to permit the belt to clear either of the pulleys of its own weight.

The main object of the present invention is to tighten or completely release and quickly check the movement of a belt of the type described with relation to its driving pulley.

Another object is to facilitate the adjustment of a device as mentioned so as to accommodate variations in size of belt due to wear or otherwise.

As an example of the field of use and one manner of embodying my invention, I illustrate the same in the accompanying drawings as applied to shoe repair machinery, and in these drawings—

Figure 1 is an end view of the upper portion of the frame of a shoe finisher and of the main tool shaft mounted thereon and a shank leveler used intermittently and mounted on a shaft driven from the tool shaft by a V-belt, the parts being shown with the belt in the driving position.

Figure 2 shows substantially the same parts with the belt in released position and for clearer illustration the figure comprises a section taken on the line 2—2 of Figure 3.

Figure 3 is in part a view looking at the front of the mechanism and in part a section taken on the line 3—3 of Figure 2.

Figure 4 is a detail view looking in the direction of the arrow 4 in Figure 2.

The machine frame is indicated at 1 and mounts the journal 2 for the machine tool shaft 3 driven by a flat belt 4 leading from a counter shaft (not shown) to a pulley 5 on shaft 3. Shaft 3 will carry brushes, buffers, sanders, and similar equipment and will be operated substantially continuously throughout certain periods of the day.

A shank leveler is indicated at 6 and constitutes an additional attachment which is mounted on the shaft 7 journalled in the support 8 and driven from shaft 3 by the V- belt 9 in extending around pulleys 10 and 11 on shafts 3 and 7, respectively. Pulleys 10 and 11 have V-shaped grooves in their periphery. Ordinarily the tool 6 will be operated for but a few minutes at a time and it is desirable when not in operation that the shaft 7 be stationary; hence the desire for a satisfactory belt tightening and releasing device.

The tightening of the belt is effected by an idler pulley 12 when the parts are in the position shown in Figure 1, and the release of the belt from the driver pulley 10, when idler pulley 12 is moved to the retracted position shown in Figure 2, is effected by the rollers 13, which engage the outer face of one flight $a$ of the belt, and by the stationary belt guard 14, which engages the outer face of the other flight $b$ of the belt. Elements 13 and 14 tend to hold the flights of the belt straight and substantially tangent to the pulleys and thereby localize the slack in the belt about the lower driver pulley 10 so that the sides of the belt will be spaced from the sides of the pulley groove, and there will be no tendency of this pulley and the belt to rotate the driven pulley 11, but the inner face of the belt will not be projected outwardly beyond the peripheral edges X of the grooves.

The idler pulley is journalled on a pin P on the upper end of an arm 15 which may be oscillated about a stud 16 by the handle 17 connected to the hub 18 of arm 15.

A flange 19 (Figure 3) on stud 16 has a pair of recesses 20, and a spring pressed ball 21 is mounted in hub 18 and is adapted to be thrust into one of the recesses 20 to hold the arm and pulley in the belt tightening or in the belt releasing position.

By loosening the nut 16a on stud 16 and rotating the same clockwise or anti-clockwise, the angular positions of recesses 20 will be varied so that the two extreme positions of the idler pulley can be adjusted to accommodate wear in the belt, or other variations in the size thereof.

Rollers 13 are mounted at the outer ends of the triangular plate 22, the inner corner of which is journalled on pin P and may be oscillated on the pin by the link 23 which is pivoted at 24 to plate 22, and at 25 to a stationary anchor member 26. This member 26 is gripped between the stud flange 19 and the opposing boss 27 on the support element 8 (Figures 3 and 4). When stud 16 is loosened, the anchor member 26 may be adjusted so as to vary the angular position of plate 22 about pin P, and this will facilitate the positioning of rollers 13 so that they are both spaced from the belt when the latter is tightened and a straight line between rollers 13 substantially clears the idler pulley. Rollers 13 both engage the belt at substantially the same time when the idler pulley is moved to belt releasing position and hold the belt against the face of the idler pulley to retard the belt movement.

The construction described provides a simple, effective, easily operated mechanism for making a belt of the type described tight or loose as desired and makes simple, adequate provision for those adjustments of the mechanism which may be encountered during the initial installation of the belt and throughout its long life or replacement.

The showing and description of the V-belt is to be understood as being illustrative only as the mechanism is similarly applicable to rope or cable drive, or other similar power transmission wherein the belt is thick and relatively stiff and functions partially through contact of its sides with the sides of grooves in its pulleys.

The details illustrated and described may be varied substantially without departing from the scope of the invention, and the exclusive use of all the novel features disclosed herein and covered by the claims is contemplated.

I claim:

1. In combination, a driver pulley, a driven pulley, a belt connecting the same, a belt tightener including an idler pulley, a pivoted arm on which said idler pulley is mounted, a device operating automatically to hold said arm either in a position where said belt is tightened by said idler pulley or in a position where said belt is slackened, said device comprising spring pressed elements projecting from said arm, a stationary plate alongside of said arm and having recesses in which said elements may be seated, and means for varying the angular position of said plate about the axis of the pivot on said arm so as to control the belt tightening and releasing positions of said idler pulley.

2. In combination, a driver pulley, a driven pulley, a belt connecting the same, an arm having a stationary pivot, an idler pulley opposing the inner face of said belt and journalled on said arm at a point spaced from said pivot, said arm being movable from a position, in which said idler pulley tightens said belt against said driver and driven pulleys, to a position in which there is slack in said belt, a member pivoted about the axis of said idler pulley, a plurality of elements mounted on said member at points spaced outwardly from the periphery of said idler pulley, a link pivotally connected to said member at a point spaced from said pivot, a pivotal anchorage for said link rigid with said arm whereby said arm, member and link form a linkage structure for shifting said elements relative to said pivot and as said idler pulley is moved between said positions the distances between said elements and the adjacent portions of the belt are substantially equalized.

3. A combination as described in claim 2 which includes means for varying the anchorage for said link to modify the pivotal movement of said member about said pivot.

ERNEST DUNFORD.